United States Patent [19]

Tamada et al.

[11] 4,062,092
[45] Dec. 13, 1977

[54] SAFETY HOOK

[75] Inventors: Yuzuru Tamada; Susumu Yoshimura, both of Hyogo, Japan

[73] Assignee: Fujii Denko Company, Limited, Hyogo, Japan

[21] Appl. No.: 702,817

[22] Filed: July 6, 1976

[30] Foreign Application Priority Data

July 11, 1975 Japan .................................. 50-96853
July 31, 1975 Japan .................................. 50-107321

[51] Int. Cl.$^2$ ............................................ A44B 13/00
[52] U.S. Cl. ............................................... 24/241 SB
[58] Field of Search ........... 24/241 R, 241 P, 241 PP, 24/241 SP, 241 SB, 241 S, 241 PS, 233, 234

[56] References Cited

U.S. PATENT DOCUMENTS

| 705,526 | 7/1902 | Gray | 24/241 PP |
|---|---|---|---|
| 1,879,168 | 9/1932 | Freysinger | 24/241 SB |
| 1,949,608 | 3/1934 | Johnson | 24/241 SB |
| 1,964,428 | 6/1934 | Duffy | 24/241 PS |
| 3,317,972 | 5/1967 | Harley | 24/241 P |

*Primary Examiner*—Paul R. Gilliam
*Assistant Examiner*—Kenneth Dorner
*Attorney, Agent, or Firm*—Nilsson, Robbins, Dalgarn, Berliner, Carson & Wurst

[57] ABSTRACT

A safety hook is provided with a spring loaded closure segment normally closing the mouth of the hook. A pin carried by the segment is normally engaged by a spring loaded crank latch. The crank latch prevents the pin and segment from rotating to open the hook mouth until the crank latch is first rotatably released under the influence of a force acting to rotate the latch in a direction opposite to the direction of rotation which would occur under the influence of the force which would be transmitted from the segment to the latch in opening.

8 Claims, 9 Drawing Figures

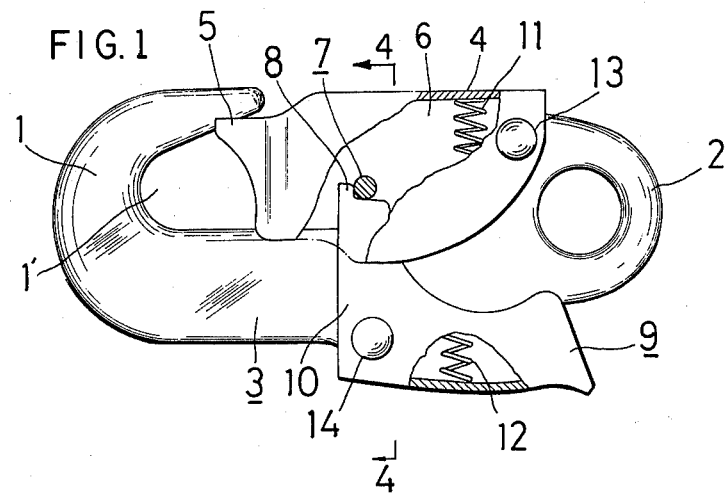
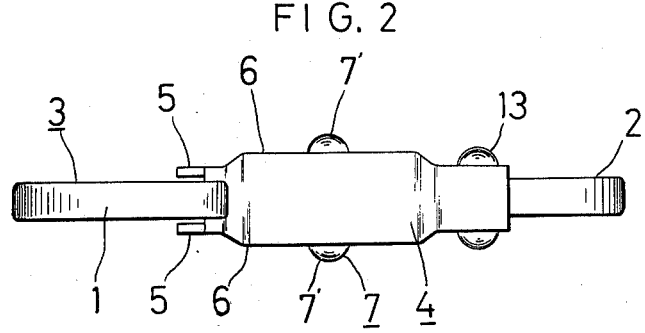
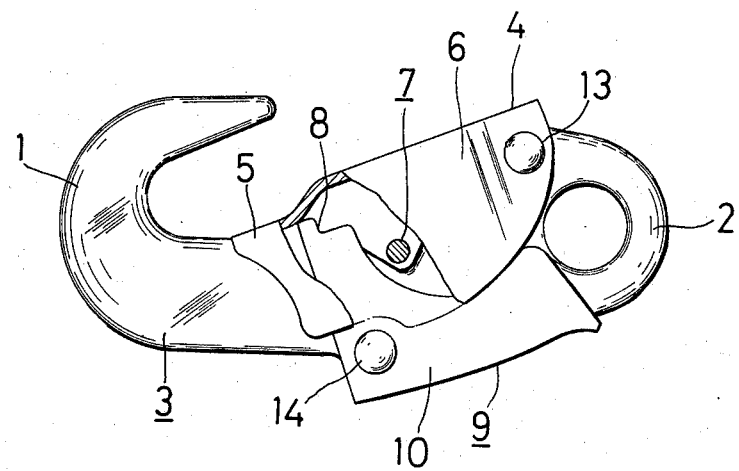

SAFETY HOOK

BACKGROUND OF THE INVENTION

The present invention relates to safety hooks, and particularly to an improvement in a safety hook for use with safety belts.

Conventional hooks are shown in U.S. Pat. No. 1,879,168, where an edge of the pivoted tongue is locked by an edge of the crank lever, and in U.S. Pat. No. 1,985,596, where a pin of the crank latch travels in a slot of the throat closure segment. When such prior hooks are used for an extended period of time, the segment or tongue will become distorted so that operability or engagability of the members is reduced, thereby nullifying the safety action of the hooks.

SUMMARY OF THE INVENTION

A safety hook includes a closure segment pivotly mounted on the hook. The segment is spring-loaded to close the hook mouth. A pin is secured to the segment. Latch means is pivotly mounted on the hook opposite the segment. The latch means has ends for engaging the pin and is spring-loaded so that the ends normally engage the pin when the segment is closed to lock the segment against opening until the latch means is independently rotated.

BRIEF DESCRIPTION OF THE DRAWINGS

The invention may best be understood when considered in light of the following detailed description of preferred embodiments taken in conjunction with the accompanying drawings, wherein:

FIG. 1 is a side elevational view, partially broken away, of the first embodiment of the hook of this invention;

FIG. 2 is a top plan view of the hook shown in FIG. 1;

FIG. 3 is a side elevational view, partially broken away, of the hook shown in FIG. 1 in the open position;

DETAILED DESCRIPTION OF THE PREFERRED EMBODIMENTS

Figure 4:
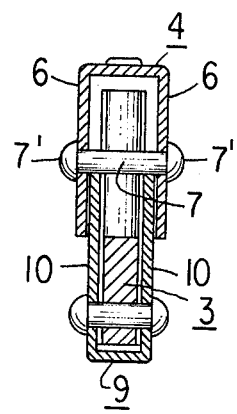
FIG. 4 is an elevational cross-sectional view taken along the line 4 — 4 of FIG. 1.
Figure 5:
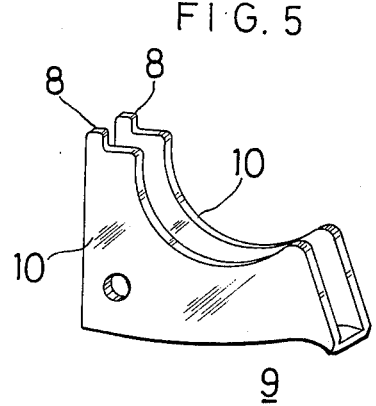
FIG. 5 is a perspective view of the crank latch employed in the first embodiment of this invention.

The safety hook of this invention, in the first embodiment, has a spring loaded closure segment 4 which normally closes the mouth 1' of the curved portion 1 of the hook. A pin 7 carried by the segment 4 is normally engaged by the ends 8 of a spring loaded crank latch 9. The crank latch 9 prevents the pin 7 and segment 4 from rotating counterclockwise to open the hook mouth 1' until the latch is rotatably released counterclockwise. The force of the pin 7 against the ends 8 of the latch when it is attempted to open the segment alone tends to rotate the latch clockwise, thus maintaining the locked relationship.

In the first embodiment of the invention, shown in FIGS. 1 - 5, a body 3 has a hook-shaped curved portion 1 and an integral ring portion 2. A closure segment 4 is pivotly mounted on body 3 by a pin 13 passing through the ring portion 2. The closure segment 4 is biased internally by a compression spring 11 bearing against the body 3. The spring 11 acts to close the mouth 1' by normally maintaining the segment 4 against the terminal portion of the curved portion 1. As is best shown in FIG. 2, spaced apart side walls 5 of segment 4 are expanded at a middle portion 6. A pin 7 passes through the middle portion 6 and is secured at both ends 7' by swaging the ends of the pin outside of the side walls 5. The enlarged ends 7' outside the walls 5 also prevent the walls from being outwardly distorted.

A crank latch member 9, having spaced apart side walls 10, is pivotly mounted to the body 3 by a pin 14 passing through the back of body 3 and through side walls 10. The ends of the pin 14 are swaged outside of the walls 10 embracing body 3. Crank 9 has a pair of extensions 8 at one end which are positioned within segment side walls 5 and which normally engage pin 7 when the hook is closed. These two extensions 8 withstand more load than would one extension. A compression spring 12 mounted inside the crank 9 bears against the body 3. The spring 12 normally rotates the crank 9 clockwise to safely lock the closure segment 4 by engaging the extensions 8 against the pin 7. A bushing (not shown) may be placed rotatably or fixedly around the pin 7 between the walls 5 to prevent the walls 5 from being inwardly distorted inwardly and to facilitate smooth engagement of the pin 7 and the extensions 8.

The ends 8 of latch member walls 10 of crank 9 ride over the body 3 and in turn ride inbetween walls 5 of segment 4 so that the ends of the walls 10 are not distorted even if segment 4 is highly loaded counterclockwise, thereby maintaining the secure engagement between pin 7 and extensions 8.

In operation, the hook is used with a rope tied to the ring 2 and to a safety belt. Latch 9 is pressed to rotate counterclockwise so that extensions 8 disengage from the pin 7. Segment 4 is then pressed to rotate counterclockwise to open mouth 1', as is shown in FIG. 3. It will be understood that the hook may be opened by gripping segment 4 and latch 9 in one hand almost simultaneously. Release of the grip enables segment 4 to return clockwise under the force of spring 11 to close mouth 1', and latch 9 to return clockwise under the force of spring 12 to engage pin 7 with extensions 8, thereby locking the segment.

Thus, mouth 1' will never be opened without rotating both the segment 4 and the latch 9 since the latch acts as a safety lock for the segment. More specifically, engagement of pin 7 with extensions 8 prevents accidental opening of segment 4 alone since, in pushing the segment down, the resulting force on the pin 7 and against the extensions 8 tends to rotate the latch 9 clockwise, thus maintaining the locked relationship. Yet, the segment is not opened by pressing latch 9 alone. This double safety lock prevents a ring or the like from being detached from hook 1 through the mouth 1' without a user's intentional operation of the safety hook , thus keeping the user safely suspended with the hook as he works.

Figure 6:
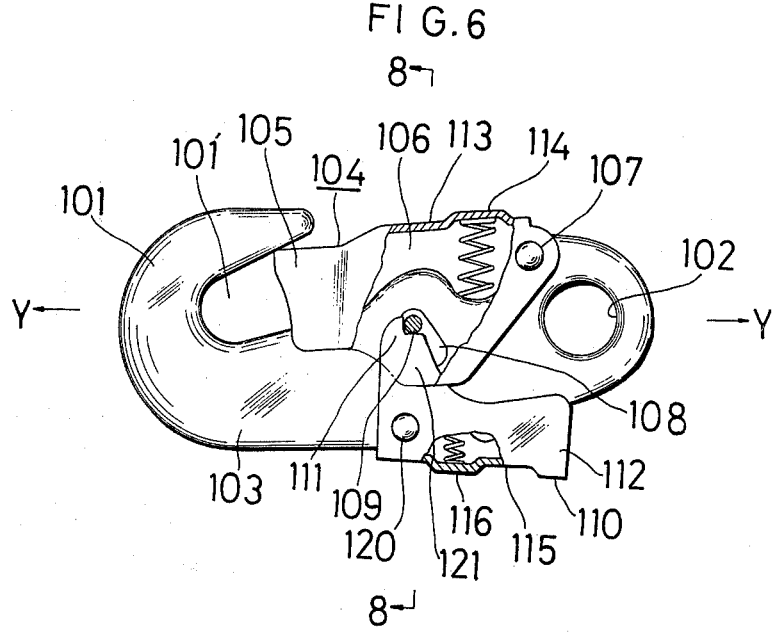
FIG. 6 is a side elevational view, partially broken away, of a second embodiment of the hook of this invention.
Figure 7:
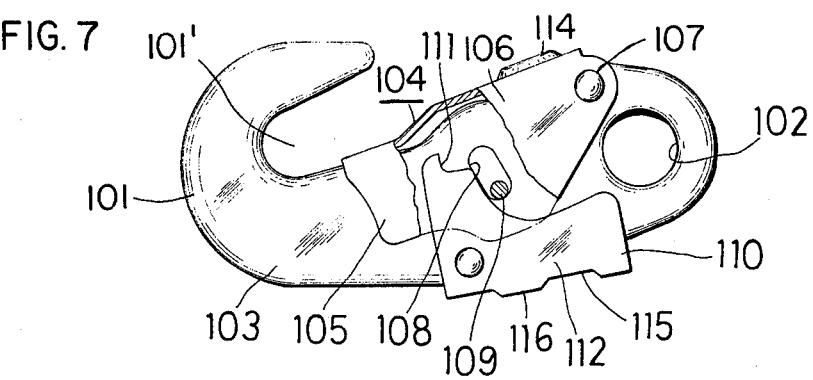
FIG. 7 is a side elevational view, partially broken away, of the hook shown in FIG. 6 in the open position.
Figure 8:
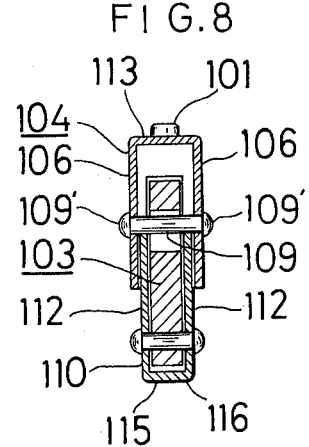
FIG. 8 is an elevational cross-sectional view taken along the line 8 — 8 of FIG. 6.

The second embodiment of the safety hook, shown in FIGS. 6 - 8, is essentially similar to the first embodiment shown in FIGS. 1 - 5. A slot 108 is provided through the middle of the body 103, preferably along an arc of the circle which would be described by the pin 109 if the pin 109 were drawn in a circle using the pivot pin 107 as the center of the circle. Top side 113 of segment 104 is formed with a projection 114 to receive one end of a compression spring. A crank latch 110 is formed with a recess 115 and a projection 116. Projection 116 receives a compression spring while projection 116 and recess 115 serve to provide a secure grip of crank 110 for a hand.

Operation of this second embodiment of the hook is the same as operation of the first embodiment.

In this second embodiment, the slot 108 in which the pin 109 moves is formed in the body 103 near to the pivot 120 of crank 110 so that the members 112 and 121 of crank 110 are able to be formed shorter than the corresponding members of the crank 9 of the first embodiment. This increases strength for tolerating loads and decreases distortion of the crank latch 110 under load. Also, shortened member 121 allows the top wall 113 at the skirt of the segment 104 to be recessed in order to make the segment 104 more compact.

Pin 109 is preferrably positioned in segment 104 so that it does not abut against the top end of the slot 108 when the segment is in the closed position, as is shown in FIG. 6. This allows segment 104 to turn clockwise until pin 109 abuts against the top end of slot 108 in the event that the curved portion 101 or mouth 101' of the hook is ever opened or bent slightly outwardly under an excess load exerted on the hook in the direction shown by arrows Y in FIG. 6, thus maintaining the hook closed. During this movement, extensions 111 of latch 110 follow the pin 109 to keep the hook safely locked.

Additionally, by providing slot 108 in which pin 109 moves, the middle of body 103 can be formed thicker in the vertical direction than the body of the first embodiment wherein pin 7 moves in an inwardly cut notch in the body 3. The widened body of this second embodiment can withstand higher loads.

Figure 9:
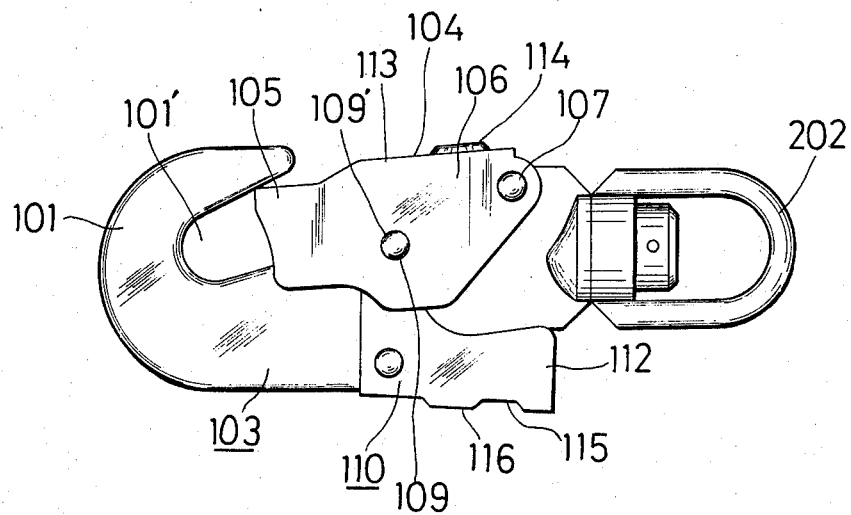
FIG. 9 is a side elevational view of a third embodiment of the hook of this invention.

FIG. 9 shows a further third embodiment of the hook which is similar to the second embodiment except for the addition of a rotary attachment 202.

Although detailed embodiments of the invention have been disclosed herein various modifications are possible, all within the scope of the invention claimed. For example the crank latches 9 or 110 may be reversed to operate in the opposite direction, various dimensions and configurations may be altered, and the like. Consequently, the specific details disclosed herein describe the best presently known embodiments for purposes of disclosure and provide a basis for the claims herein which define the scope of the invention.

What is claimed is:

1. A safety hook, comprising:
a hook body;
a closure segment pivoted on said hook body and spring-loaded to close said hook, said segment having partially expanded, spaced apart side walls;
a pin passing through said segment, said pin having ends secured against the outside of said side walls; and
latch means pivoted on said hook opposite said segment and having ends adapted to engage said pin, the expanded portions of said side walls enclosing and being adapted to ride over said ends of said latch means, said latch means being spring-loaded so that said pin is normally engaged by said ends to lock said segment in a closed position,
whereby said segment side walls are prevented from distorting outwardly by said secured pin ends, said latch ends are prevented from distorting outwardly by said segment side walls, and said segment is adapted to be unlocked by rotating said latch means against its spring bias to disengage the latch means ends from the pin.

2. A safety hook as defined in claim 1, wherein said body is provided with a slot in which said pin travels.

3. A safety hook as defined in claim 1, wherein the pivot of the latch means and the point of engagement between the pin and the ends are positioned with respect to each other so that a force tending to open the segment applied to the ends through the pin acts to maintain the segment and latch means in the locked condition.

4. A safety hook as defined in claim 3, wherein said opening force applied to the ends tends to rotate the latch means in a direction opposite the direction of rotation required to unlock the segment.

5. A safety hook, comprising:
a hook body having an open hook mouth;
a closure segment rotatably mounted on the hook body and spring-loaded to normally close the mouth of the hook, said segment having partially expanded, spaced apart side walls;
a pin passing through said closure segment, said pin having ends secured against the outside of said side walls; and,
latch means pivotally mounted on the hook body and having ends adapted to engage said pin to lock the segment against opening, the expanded portions of said side walls enclosing and being adapted to ride over said latch means, said latch means ends being biased to normally engage said pin when the segment is closed, the pivot of the latch means and the point of engagement between said pin and said ends being positioned with respect to each other such that a force tending to open the segment applied to the ends through the pin acts to maintain the segment and latch means in the locked condition,
whereby said segment side walls are prevented from distorting outwardly by said secured pin ends, said latch ends are prevented from distorting outwardly by said segment side walls, and said segment is adapted to be unlocked by rotating said latch means against its spring bias to disengage the latch means ends from the pin.

6. A safety hook as defined in claim 5, wherein:
the closure segment moves across the hook mouth and over the hook body to open the hook mouth and beas against the inside of the hook to close the hook mouth; and,
said opening force applied to the latch means ends tends to rotate the latch means in a direction opposite to the direction of rotation required to unlock the segment.

7. A safety hook as defined in claim 6, wherein:
a slot is formed in said hook body and said pin travels in said slot.

8. A safety hook as defined in claim 7, wherein:
said closure segment and latch means are adapted to rotate counterclockwise to unlock and open the hook mouth, said opening force applied to the latch means ends tends to rotate the latch means clockwise, and said closure segment and latch means are biased to rotate clockwise.

* * * * *